May 11, 1965  R. J. GRADER ETAL  3,183,390
PHOTOMULTIPLIER
Filed June 5, 1963  2 Sheets-Sheet 2

INVENTORS
RODERICK J. GRADER
BY  MINORU PAUL NAKADA

ATTORNEY

United States Patent Office 3,183,390
Patented May 11, 1965

3,183,390
PHOTOMULTIPLIER
Roderick J. Grader, Pleasanton, Calif., and Minoru Paul Nakada, Silver Spring, Md., assignors to the United States of America as represented by the United States Atomic Energy Commission
Filed June 5, 1963, Ser. No. 285,843
13 Claims. (Cl. 313—95)

The present invention relates to photomultipliers and more particularly to a high gain electron multiplier and photodetector selectively sensitive to intermediate and high energy photons, such as X-rays, and capable of discriminating against detection of low energy X-rays, for example below 50 electron volts (ev.), which characteristics are especially advantageous in use in certain outer space applications.

The detection of soft X-rays having energies less than about 1 kilo electron volt (kev.) in outer space is important for astronomical study and for the detection of nuclear explosions. Therefore there is a need for devices for making such measurements and generally designed to be able to function under the conditions found in outer space. One of the principal obstacles to the detection and measurement of X-rays of the desired energy levels in outer space is the greatly disproportionate abundance of other, residual X-rays having discrete energies of the order of 10 ev. and possibly also of about 40 ev. Such great quanttiies of X-rays having energies of 10 ev. are produced and exist in the solar system as the result of resonance scattering from the hydrogen therein. Studies indicate that similar amounts of 40 ev. radiation arising from scattering reactions with singly ionized helium should also be present. To understand the problem presented by the 10 ev. and 40 ev. X-rays in space, it must be understood that they exist in quantities which are estimated to be thousands of times the quantity of all other X-rays present. Thus, it becomes clear that for a device to be effective in detecting and measuring X-rays of the desired energies in outer space, it must be able to discriminate very strongly against low energy radiation such as the 10 ev. and 40 ev. X-rays. If this is not done, the over-abundance of 10 ev. and 40 ev. X-rays will obscure the X-rays of other energies and prevent their detection.

In general, in a detector of the type suitable for the detection of X-rays, there is employed a surface responsive to the radiation by the emission of electrons, which surface serves as a cathode and is usually termed a photocathode. The electrons emitted therefrom form an electrical current which is generally too small to be measurable by convenient methods. Accordingly an amplifier, most conveniently in the form of a dynode structure is employed in association with the cathode structure to raise the current to a more tractable level.

In devices known in the art it is usual to dispose an anode or dynode in surrounding relation with respect to the cathode, so that the collections of photoelectrons emitted by the photocathode can be effected. In accordance with conventional practice, to prevent the detection of the great quantities of unwanted photoelectrons generated by the 10 ev. and 40 ev. radiation, a negatively biased grid is placed as a cover around the cathode in order to repel such unwanted electrons and prevent their entry into the detection system.

While the grid is capable of suppressing the photoelectrons produced by the 10 ev. and 40 ev. residual photon radiation field, the use thereof simultaneously introduces another disturbance of nearly equal seriousness and offsets the improvement sought. Since photons of the incident radiation do not react to the electrical potentials as do charged particles, the 10 ev. and 40 ev. X-rays are unrestrained by such a grid potential and can strike the grid and cause electrons to be freed therefrom. These electrons originating at the grid are drawn to the collecting anode or dynode in the same way as are the electrons from the cathode, and thereby cause unwanted current components. The current formed by the electrons from the grid often reaches a magnitude which is greater than the current produced by the electrons from the cathode and thus obscures the value of the latter current and thereby renders any data derived meaningless. This result occurs even with the best of available grid designs, for example, with grids made of material selected to be the least photoresponsive and with an area presented by the grid being reduced to a small fraction of the total area available at the cathode, for example only a thousandth or less of the offered by the cathode. Similar situations may also be encountered terrestrially.

In general, the dynode structure used to multiply the current produced by the photoelectrons emerging from the photocathode is composed of surfaces maintained at differential electrostatic potential which surfaces respond to impinging electrons by the emission of other electrons, called secondaries. Each dynode stage of the multiplier produces secondaries in greater quantity than those received by it, whereby electron multiplication is achieved. The amount of multiplication is dependent upon the number of dynode stages and the loss between stages. The dynode structures for use in photomultipliers as known in the art employ curved, cupped shaped structures maintained at such potential with respect to each other that the electron flow is successively from one cup to the next. Since the original source of electrons may emit the electrons in a rather random directional distribution, electrostatic and magnetic potential focusing means are generally used to direct the electrons to the first dynode. To prevent the loss of secondaries in the space between successive dynodes similar electrostatic and magnetic potential focusing means are required.

The present invention provides an electron multiplier assembly having dynode elements so arranged and so shaped as to greatly reduce the number of electrons lost between dynode stages and greatly simplifies the requirements for focusing arrangements. Said dynode electron multiplier is of general utility for use in sensitive photomultiplier detection devices. The invention also provides photon sensitive arrangements of especially adapted cathode emissive elements, in association with the electron multiplier dynode assembly and other associated components, providing for the sensitive and selective detection of randomly distributed low and intermediate range soft X-rays and other radiation of energy greater than selected low energy cut off levels. Accordingly, there is provided notable improvements in the capability of photomultiplier apparatus for detecting radiation and especial advantages under the circumstances as noted herein.

An object of the invention is to provide an improved photomultiplier apparatus for use in detecting radiation.

Another object of the invention is to provide an improved dynode structure for high gain electron multiplication.

Another object of the invention is to provide a dynode electron multiplier wherein the electron loss between stages is minimized.

Still another object of the invention is to provide a dynode electron multiplier wherein the need for certain types of electric or magnetic focusing grids is eliminated.

A further object of the invention is to provide an efficient soft X-ray detector suitable for operation in outer space.

Still another object of the invention is to provide an X-ray detector which will be relatively insensitive to X-rays of less than about 50 electron volts.

A still further object of the invention is to provide a photon detector wherein the need for focusing of the electron current between the photocathode detector and dynode multiplier is minimized.

Other objects, features, and advantages, and a better understanding of the invention will become apparent in the following detailed description when considered with the accompanying drawings, in which.

Figure 1:
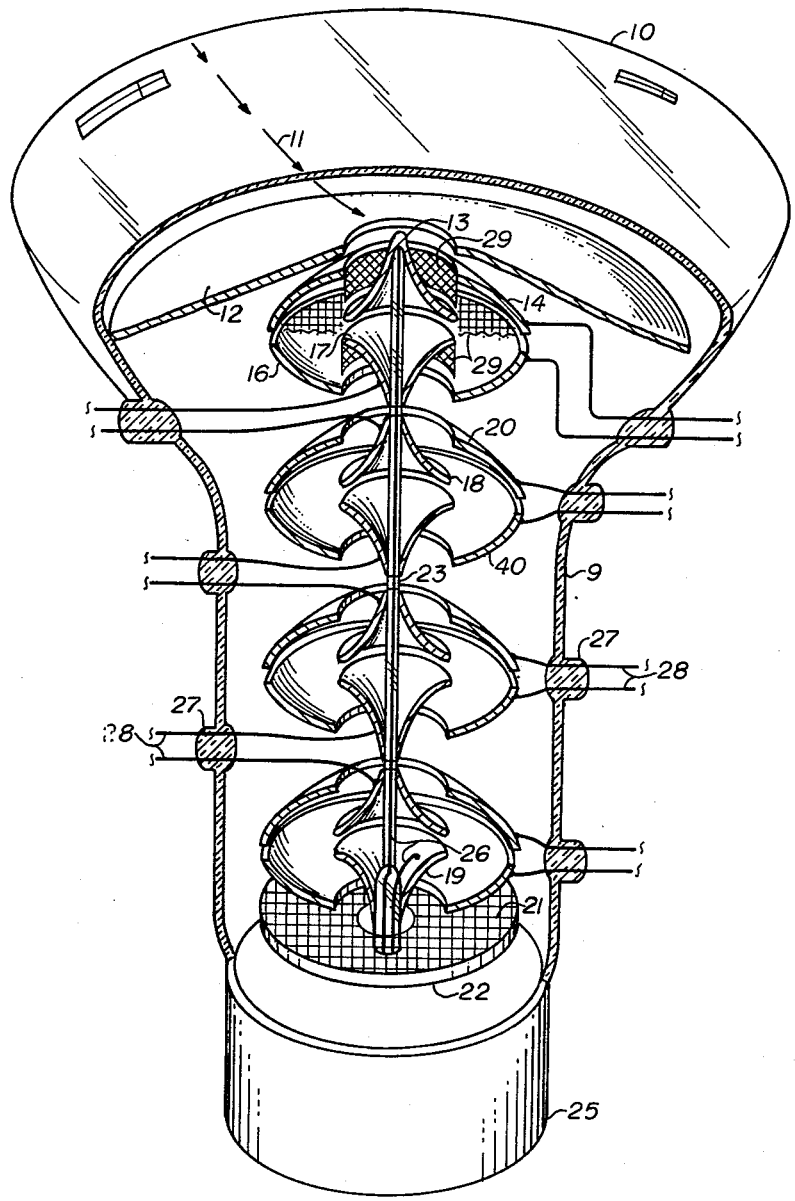
FIGURE 1 is a perspective elevation view partly in cross-section of a photomultiplier tube and particularly the dynode assembly constructed in accordance with the teachings of the invention.

Referring now to FIGURE 1, there is shown a photomultiplier photon sensitive detector including an electron multiplier assembly of dynodes constructed in accordance with the invention and enclosed within an appropriate basemounted, evacuated envelope tube 9. Such tube 9 includes a cylindrical section within which said dynode assembly is longitudinally disposed and a bulbous end portion terminating in a flat or arcuate end face 10 upon the inner surface of which is provided a photoemissive cathode surface coating (not shown) as in conventional practice. Electrons 11 are produced by impinging photon radiation on said photocathode surface and are focused by means of an electric field shaping electrode 12 which may be a flattened inverted frusto-conical shell (frusto-conical referring to the frustum of a cone) disposed transversely in said bulbous envelope portion. The cathode coating and electrode 12 may be electrically common and at a negative potential of about 50 to 150 volts D.C. with respect to a photoelectron collector, dynode 13. More specifically the electrons are directed by the aforesaid potential through a central opening in said electrode 12 to fall upon the first dynode 13 of said assembly. Dynode 13 has an outward and upward facing electron emissive surface of generally frusto-conical concave shape. For general application dynode 13 as well as successive dynodes described hereinafter is constructed to provide a secondary electron emissive surface and may be of a material such as silver magnesium composition or other material of conventional composition which emits electrons in response to bombardment by electrons with the ratio of emitted electrons to capture electrons being greater than one. Dynode 13, however, may alternatively be of a material suitable for use as a photocathode, i.e., cesium or cesium-antimony composition as will be explained in connection with FIGURES 2 and 3, and the electrons would thus originate therefrom, in which case the photosensitive cathode surface and focusing electrode described above, may be omitted.

With more particular reference to the construction of said dynode assembly, a ring-shaped second dynode 14 is supported in insulated spaced relation coaxially circumjacent dynode 13 and positioned so as to collect electrons emitted therefrom as completely as possible. For this purpose dynode 14 is frusto-conically shaped with a generally concave electron emissive surface facing inwardly toward said concave surface of dynode 13. For most purposes such dynodes may be fabricated from an appropriate sheet metal as by stamping or to provide frusto-conical or annular dynode members having an appropriately curved surface. Such members may be formed completely of photoemissive material or the electron emissive property may be provided by applying a layer of conventional silver magnesium composition or similar materials upon such surfaces. The choice between such material is principally dictated by the nature and energy of the particles, electrons or photons, respectively, which impinge upon said surfaces and which are to cause the emission of electrons. With such sheet metal dynodes or any other dynode fabrication, the concave electron emissive surfaces are usually curved to provide a circular arc of intersection with a diametrical transverse plane. In operating such a dynode assembly it will be appreciated that dynode 14 is maintained at a positive electrical potential with respect to dynode 13, of the order of 50 to 150 volts D.C. dependent upon the electron emissive characteristics of the emissive surface and the desired operating gain per stage, each successive dynode is similarly maintained at a higher positive potential than the preceding dynode as by coupling each dynode to an appropriate junction of a voltage divider (not shown). With such an applied voltage electrons emitted from dynode 13 are accelerated to impinge upon the photoemissive surface of dynode 14 to cause a multiplied number of electrons to be emitted therefrom to successsive dynodes of said assembly in order.

A third dynode 16 being a mirror image to dynode 14 and of frusto-conical configuration is disposed in insulated spaced coaxial relation to said dynode 14 so as to be able to effectively collect the electrons multiplied and emitted from dynode 14. To this end dynode 16 is concave with respect to dynode 14 so as to be able to effectively collect the electrons multiplied and emitted from dynode 14. To this end dynode 16 is concave with respect to dynode 14 and disposed in coaxial alignment below dynode 14. The electrons multiplied and emitted from dynode 16 are directed to impinge upon the electron emissive surface of a fourth dynode 17 encompassed in circumjacent coaxial relation by dynode 16. Said dynode 17 is similar in construction to dynode 13 but is disposed in inverted coaxial relation thereto. Thereafter there is provided a fifth dynode 18 similar to dynode 13 and disposed in a similar sense thereto, however, in closely spaced coaxial relation below dynode 18, whereby the electron emissive surface faces the similar surface of dynode 17. Other dynodes are disposed in like-fashion to those foregoing through as many stages as are necessary to produce the required multiplication.

Each dynode in order is maintained at a higher positive potential than the preceding dynode in order to provide accelerating paths for successively emitting electrons. Although the number of dynodes employed is determined by the particular circumstances surrounding their use, dynodes 14, 16, 17, and 18 can be viewed as one set of four dynodes, and each succeeding four dynodes making up another set. Each set consists of two pairs of dynodes. The first pair consists of an outer dynode with a concave-downward facing inner surface (concave-downward referring to the frusto-conical lateral surface of the dynode) such as 14, and an outer concave-upward dynode, such as 16. The second pair of dynodes consists of an inner concave-downward dynode, such as 17, and an inner, concave-upward dynode, such as 18. As many sets and additional pairs of dynodes may be arranged in serial coaxial alignment as may be necessary to achieve the desired level of amplification. In the specific embodiment of FIG. 1 three additional sets of dynodes are shown as has been found suitable for an amplification gain factor of the order of $10^8$.

Such a set of dynodes can be thought of as the four arcuate annular shell portions obtained when a hollow torus is divided into four cylindrical parts by the insersection of a diametrical transverse plane and a cylindrical surface having a radius equal to the major longitudinally oriented radius of said torus and normal to the forementioned transverse plane. There is no reason, however, that the assembly must terminate with a complete set of dynodes, since the necessary amplification may be obtained with an intermediate number of dynodes, for example less than four, or some number not a multiple thereof. The series of dynodes may terminate with any of the component dynodes provided the final collector is appropriately disposed with respect to the last of the dynodes of the structure. In the device shown in FIG. 1 the final dynode 19 is an inner concave-downward dynode corresponding to dynode 17 which effectively directs the emergent multiplied electrons therefrom to an anode 22. The anode 22 is in the form of a cupped, annular disc coaxially disposed below dynode 19, the upper surface of which may be covered with an annular focusing screen 21, which is electrically common to said anode 22.

Alternatively, looking at the structure of the electron multiplier as a whole, it may be regarded as two matched, coaxially aligned series of dynodes, an inner series and an outer series. The inner series consists of dynodes 13, 17, 18, etc.; the outer series consists of dynodes 14, 16, 20, 40, etc. As shown in FIGURE 1 said inner series of dynodes is placed coaxially within the outer series, and in alternating, serial complementary relation thereto whereby the secondary electrons formed at the surface of a member of the inner series such as 13 travel radially outward to a member of the outer series 14, forming more secondaries which travel longitudinally to a second member of said outer series 16, forming secondaries which travel to dynode 17 and thence to dynode 18 members of the inner series. When thus viewed, it is seen that the process of multiplication can be begun at any dynode of either series as is geometrically convenient to a source of electrons to be multiplied. Further, the multiplication stages are characterized by being alternately complementary in that the secondaries and multiplication takes place at a first outer dynode, a second outer dynode, a first inner dynode, a second inner dynode, a third outer dynode and so forth. To this end the accelerating voltages applied to the dynodes increase in the same order as discussed immediately preceding.

Although not necessary for operation of the device, a modification which aids in reducing electron loss is the addition of focusing screens 29. Screens 29 may be constructed of tungsten or nickel and are electrically attached one to each of the dynodes and interposed each respective dynode and the electrically preceding dynode. The shape of the screens is either cylindrical as shown attached to dynodes 14 and 17, or that of an annular disk, as attached to dynode 16 and anode 22. The screens, being in electrical contact with their respective dynodes, act to establish a more uniform and intense electric field between the dynode stages. The area of grid metal in the screen, compared to that of the interstices, is so small as to present no problem of preventing electrons from reaching the dynodes. For reasons of simplicity such screens 29 are not shown as mounted on all the dynodes, but are shown herein only on dynodes 14, 16, 17 and on anode 21; however, such screens may be provided on any or all of the dynodes of the assembly. Circular focusing screen 21 of previous mention likewise serves to establish a uniform electric field between dynode 19 and anode 22.

A hollow, glass rod 23 (or similar insulating support structure) is disposed along the axis of the tube 9 which houses the dynode structure and serves advantageously to support and insulate the inner dynodes including the first dynode 13, as well as carry the individual electrical conductors 26 which may be terminated at the end center dynodes 13 and 19 from terminals (not shown) in the mounting base 25. Glass (or similar insulating material) supports (not shown) secured to the tube 9 and each outer dynode may be used to secure said outer dynodes in place. Conductors 28 are brought through metal to glass seals 27 in the wall of tube 9 and connected to each dynode. The loss of electrons between dynodes is kept to a minimum with the foregoing construction and exceptional efficiencies due thereto allow fewer dynode stages to be used for a required amount of multiplication when compared to devices available heretofore.

Figure 2:
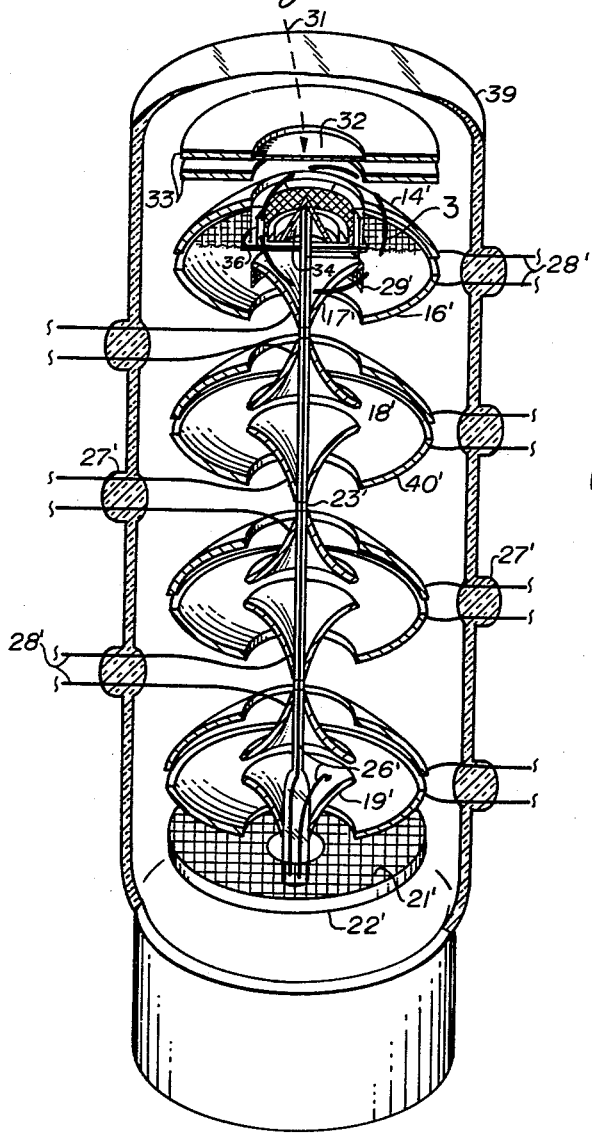
FIGURE 2 is a perspective elevational partly in cross-section view of a photomultiplier including a photocathode, constructed in accordance with the teachings of the invention.
Figure 3:
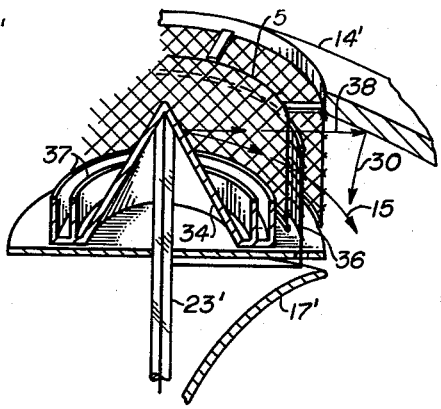
FIGURE 3 is an enlarged perspective longitudinal cross-section of the photoemissive cathode detector and first multiplier stage of the photomultiplier of FIGURE 2, constructed according to the invention.

Referring now to FIGURES 2 and 3 there is shown in preferred embodiment of a photomultiplier assembly, including a photoemissive cathode together with the dynode assembly constructed in accordance with the disclosure as above and enclosed in elongated cylindrical tube envelope 39, which for terrestrial use must be sealed and evacuated. For especial use in outer space, it will be appreciated that glass tube envelope 39 may be replaced or supplemented with a suitable X-ray absorbent envelope which need not be evacuated. The use of such an X-ray absorber will prevent any possibility of the generation of unwanted stray currents within the dynode multiplier caused by X-ray photoelectrons formed at any of the dynodes or anode. Photons 31 pass through the end of tube 39 which must be of a material transparent to the photons to be measured, and through window 32 in a collimator 33 to strike a conical shaped photoemissive cathode 34. Window 32 can simply be a bore in collimator 33 or may be a thin sheet of aluminum or plastic of about 5,000 angstroms thick which will preferentially pass photons of energies greater than 10 ev. For use in outer space the aluminum window 32 may be used to filter essentially all of the 10 ev. photons and leave only the 40 ev. photons to be dealt with. Even if no foil is used, the system is able to substantially eliminate the effect of the ten ev. photons, as will be explained. Cathode 34 is constructed of a suitable photoemissive material such as a cesium-antimony composition and is maintained by a suitable voltage divider and power source at an electrical potential between 10 volts and 20 volts positive with respect to the first dynodes multiplier stage 14' which serves as the photoelectron collector. The potential applied to the photosensitive cathode 34 and all the dynodes may be derived from a suitable voltage source and voltage dividers system applied to said cathode and said dynode by means of conductors 28' which may be led through the tube wall or down through the tube to base pins (not shown). Although all of the photons which pass through window 32 are able to reach cathode 34, only those will be detected which are able to generate photoelectrons having energies greater than the difference in potential between the cathode and the collector dynode 14' will be able to transverse that opposing electric field. While it may seem appropriate to use a bias of about 40 volts to prevent the 40 ev. helium scattering radiation in outer space from being detected, it has been found that the majority of the photoelectrons generated by the 40 ev. helium photons will have an energy less than 20 volts due to the thermalization collision losses within the cathode. Thus the ten electron volt and 40 electron volt photons are effectively prevented from introducing any appreciable number of their generated photoelectrons into the system and thereby obscuring the effects of photons of other energies.

Instead of applying a positive potential to cathode 34 with respect to dynode 14' a selector grid 36 could be disposed around cathode 34, but not between said cathode and the incoming photons. Selector grid 36 is maintained at a bias voltage between 10 volts and 20 volts negative with respect to the cathode and operates to prevent the passage of photoelectrons having energies less than the bias in the same manner as previously described for a biased cathode. In neither of these preferred arrangements is there a grid structure in the path of the abundant 10 ev. and 40 ev. photons and therefore no unwanted signal components due to grid bombardment are generated in the system. When a selector grid 36 is employed it is also advantageous to dispose a field shaping grid 5 between the cathode and the selector grid, which field shaping grid is made electrically common to collector dynode 14'.

The apex angle of conical cathode 34 is generally determined by the desired shape of the electric accelerating field between the cathode and its collector, dynode 14', and the fact that emerging photoelectrons will generally leave the cathode in a direction normal to its surface. For a dynode 14' in close electron receiving relation to the cathode an angle of 60 degrees has been found suitable. This condition provides that the majority of photoelectrons will be directed out of the cathode 34 and toward the secondary emission surface of dynode 14' via paths generally indicated by arrow 38. The electrons from cathode 34 which follow path 38 and strike surface 14' impart energy to electrons in surface 14' and cause them to leave that surface. The electrons emerging from surface 14' are induced to follow the path generally indicated by arrow 30 by the electric field set up by the next dynode stage 16'.

Those electrons from cathode 34 which possess sufficient energy to pass barrier grid selector 36 but not enough to reach dynode 14' join the electrons from dynode 14' by paths indicated at 15 and are not lost for detection purposes as are the weak electrons of prior art devices. The electrons following paths 15 and 30 form a current which is amplified by means of the electron multiplier as shown in FIG. 2 and which furnishes the information concerning soft X-rays which is desired. The operation of the electron multiplier portion of the phototube of FIGS. 2 and 3 is the same as that of the multiplier of FIG. 1, for which reason like parts have been given primed like numbers and no further explanation is necessary.

Although the general tendency of photons striking cathode 34 is to give up their energy to electrons in the cathode, a small percentage of the photons are reflected off of the surface and present a source of possible error. To prevent these reflected photons from getting into the system, a series of concentric cylindrical baffles 37 may be placed around the base of cathode 34 and absorb the photons which reflect therefrom.

Thus, the invention is seen to provide a device for the detection of soft X-rays which does not have the inherent disadvantages of the devices of the prior art, and therefore enables useful data concerning X-rays from outer space and terrestrial sources to be obtained.

While the invention has been disclosed with respect to but two specific embodiments, it will be apparent to those skilled in the art that numerous variations and modifications may be made within the spirit and scope of the invention and thus it is not intended to limit the invention except as defined in the following claims.

What is claimed is:

1. An electron multiplier comprising a first dynode having a generally conical curved secondary electron emissive lateral surface facing outwardly from the axis of said dynode, a second dynode circumjacent said first dynode in coaxial alignment therewith and having a generally frusto-conical curved secondary electron emissive surface facing inwardly towards said first dynode, and an anode in electron receiving relation to said second dynode.

2. A device according to claim 1 including an annular electric field shaping electrode disposed coaxially adjacent the apex of said first dynode.

3. An electron multiplier comprising a first dynode having a generally conical curved secondary electron emissive lateral surface facing outwardly from the axis of said dynode, a second dynode circumjacent said first dynode in coaxial alignment therewith and having a generally frusto-conical curved secondary electron emissive lateral surface facing inwardly towards said first dynode, an anode in electron receiving relation to said second dynode, an evacuated envelope disposed about said first and second dynodes and said anode, and conductor means connecting said dynodes and said anodes to the outer portion of said envelope.

4. An electron multiplier comprising a first dynode having a generally conical curved secondary electron emissive surface facing away from the axis of said dynode, said first dynode having an apex, and a lateral surface, said apex defining a first extremity of said electron multiplier, a second dynode circumjacent said first dynode and in coaxial alignment therewith having a generally frusto-conical curved secondary electron emissive lateral surface facing inwardly toward said axis of coaxial alignment, a third dynode disposed in mirror image relation to said second dynode and coaxially oriented therewith and away from said first extremity of said electron multiplier, and an anode in electron receiving relation to said third dynode.

5. An electron multiplier comprising a first linear coaxially aligned series of paired dynodes having frusto-conical curved secondary electron emissive surfaces facing inwardly toward said axis of coaxial alignment, a second linear coaxially aligned series of paired dynodes having frusto-conical curved secondary electron emissive surfaces facing outwardly from said axis of coaxial alignment, and spaced in alternating serial complementary relation coaxially within said first series of said dynodes, said first and second series of dynodes together forming an arrangement with a first terminal member thereof in electron receiving relation to an electron source, and an anode in electron receiving relation to a second terminal member of said arrangement of dynodes, whereby the secondary electrons formed within said arrangement of dynodes travel sequentially from a first member of a pair of either of said series of dynodes, then thence longitudinally to the second member of said pair, thence radially to a first member of an adjacent pair of dynodes of the other of said series of dynodes, and in like manner through the dynode structure until collected by said anode.

6. A device according to claim 5 including a plurality of focusing screens electrically connected respectively to said multiplier dynodes and interposed between said respective dynode and the immediately preceeding dynode.

7. A photomultiplier comprising a conical photocathode, a dynode disposed circumjacent said photocathode and in coaxial alignment therewith and having a generally frusto-conical curved secondary electron emissive lateral surface facing inwardly towards said axis of coaxial alignment, and an anode in electron receiving relation to said dynode.

8. A device according to claim 7 including a plurality of cylindrical baffles disposed coaxially about the base of said photocathode.

9. A device according to claim 7 including an evacuated envelope disposed about said cathode, said dynode, and said anode and conductor means connecting said cathode, said dynode and said anode to the outer portion of the envelope.

10. A device according to claim 7 including a plurality of annular collimator means disposed in coaxial alignment with said photocathode and in the space contiguous to the apex of said photocathode.

11. A photomultiplier comprising a conical photocathode having an apex and a lateral surface, said apex defining a first extremity of said photomultiplier, a first dynode circumjacent said photocathode and in coaxial alignment therewith, having a generally frusto-conical curved secondary electron emissive surface facing laterally inward toward said axis of coaxial alignment, a second dynode disposed in mirror image relation coaxially adjacent said first dynode and rearwardly away from the said first extremity, said second dynode having a generally frusto-conical curved secondary electron emissive lateral surface facing inwardly towards said axis of coaxial alignment, and an anode in electron receiving relation to said second dynode.

12. A photomultiplier comprising a conical photocathode, a first linear coaxially aligned series of paired dynodes having frusto-conical curved secondary electron emissive surfaces facing inwardly toward said axis of coaxial alignment, a second linear coaxially aligned series of paired dynodes having frusto-conical curved secondary electron emissive surfaces facing outwardly from said axis of coaxial alignment and spaced in alternating serial complementary relation coaxially within said first series of dynodes, said first and second series of dynodes together forming an arrangement with a first terminal member thereof in electron receiving relation to said photocathode and coaxial therewith, and an anode in electron receiving relation to a second terminal member of said arrangement of dynodes, whereby the secondary electrons formed within said arrangement of dynodes travel, sequentially, from a first member of a pair of either of said series of dynodes, thence longitudinally to the second member of said pair, thence radially to a first member of an adjacent pair of dynodes of the other series of dynodes, and in like manner through the dynode structure until collected by said anode.

13. A device according to claim 12 including a plurality of screens electrically connected respectively to said multiplier dynodes and interposed between said respective dynodes and the immediately preceding dynodes.

References Cited by the Examiner
UNITED STATES PATENTS

| | | | |
|---|---|---|---|
| 2,424,850 | 6/47 | Roman | 313—95 |
| 2,433,724 | 12/47 | Wolfgang | 313—95 |

GEORGE N. WESTBY, *Primary Examiner.*